United States Patent [19]
Katoh

[11] 4,036,535
[45] July 19, 1977

[54] BRAKING FLUID PRESSURE CONTROL DEVICE

[75] Inventor: Sadao Katoh, Yokosuka, Japan

[73] Assignee: Nissan Motor Co., Ltd., Yokohama, Japan

[21] Appl. No.: 672,174

[22] Filed: Mar. 31, 1976

[30] Foreign Application Priority Data

Apr. 1, 1975 Japan .............................. 50-42839[U]

[51] Int. Cl.² .......................... B60T 8/26; B60T 13/06
[52] U.S. Cl. .................................... 303/6 C; 303/24 C
[58] Field of Search .................. 303/6 C, 24 A, 24 C, 303/24 F

[56] References Cited

U.S. PATENT DOCUMENTS 3,922,020  11/1975  Koike et al. ......................... 303/6 C

*Primary Examiner*—Duane A. Reger
*Attorney, Agent, or Firm*—Lowe, King, Price & Markva

[57] ABSTRACT

In a braking fluid pressure control device, a push rod engages against a blind end of a bore extending inwardly and axially with respect to a plunger. Between the plunger and the push rod, the bore provides clearance increasing from the blind end of the bore toward an open end thereof. The push rod projects from the open end of the bore outside the plunger and engages against a plunger seat slidably fitted in a housing bore. The push rod is biased by a spring which is compressed between the plunger seat and a piston. As a result, a radial force is prevented from acting on the plunger as the plunger is urged by the piston. This avoids damage to an inner wall by the plunger increasing the durability of the control device.

9 Claims, 5 Drawing Figures

BRAKING FLUID PRESSURE CONTROL DEVICE

The present invention relates generally to a braking fluid pressure control device comprising valve means serving as a proportioning or limiting valve and control means for varying a critical fluid pressure in accordance with variation in the weight of the motor vehicle and particularly to an improved braking fluid pressure control device of this type in which a push rod and a push rod seat are interposed between a plunger of the valve means and a spring thereof so that the plunger is prevented from receiving from the spring a radial force which damages a valve seat of the valve means to reduce the durability of the control device.

As is well known in the art, usual motor vehicle hydraulic braking systems are such that the brake are applied to the front and rear wheels concurrently. In this instance, if an excess amount of braking force is applied to the front wheels, the front wheels are locked earlier than the rear wheels to make impossible for the driver to handle the motor vehicle. On the contrary, if the rear wheels are braked excessively, they are locked prior to the front wheels to cause the rear portion of the motor vehicle to swing transversely to the axis thereof. Accordingly, in order to assure and increase the safety and stability of the vehicle during its braking operation, it is necessary to effect the distribution of the braking forces to lock the front and rear wheels concurrently.

When the vehicle is braked, the so-called nose-phenomenon takes place in which the vehicle weight supported by the front wheels increases and the vehicle weight supported by the rear wheels decreases. Accordingly, it is necessary for concurrently locking the front and rear wheels to distribute to the front wheels a braking force greater than a braking force distributed to the rear wheels. It is also necessary that the distribution of the braking forces to the front and rear wheels is varied in accordance with variation in the vehicle weight. Thus, ideal characteristics of the distribution of the braking forces to the front and rear wheels, when are illustrated on oblique coordinates having the axes of abscissa and ordinate indicating respectively thereon the ratios (deceleration rate ratios) $Bf/W$ and $Br/W$ of the braking forces $Bf$ and $Br$ on the front and rear wheels versus the vehicle weight $W$, are expressed by a curve having tangents the angles of inclination of which are relatively large within a range of the origin to a certain value and are relatively small outside the range. Furthermore, the ideal characteristics of the braking force distribution are expressed by different curves in accordance with different weights of the vehicle so that the heavier the vehicle weight is, the higher the ideal characteristics curve is located on the coordinates.

It is accordingly necessary for providing the distribution of the braking forces which is close to the ideal characteristics curve to feed to the rear wheel cylinders a fluid pressure increasing at a rate smaller than that of increase in a master cylinder fluid pressure fed to the front wheel cylinders or at a rate of zero when the fluid pressure fed to the front wheel cylinders exceeds a predetermined fluid pressure. As a solution to the problem, a limiting valve, proportioning valve or G valve was disposed as a braking fluid pressure control valve in a rear braking circuit leading to the rear wheel cylinders. The limiting valve generates an output fluid pressure increasing at a rate of zero when an input fluid pressure exceeds a critical fluid pressure. The proportioning valve generates an output fluid pressure increasing at a rate lower than that of increase in an input fluid pressure when the input fluid pressure exceeds a critical fluid pressure. The G valve generates an output fluid pressure increasing at a rate less than an input fluid pressure when a predetermined rate of deceleration is attained. However, the output fluid pressure generated by these valves merely carried out the distribution of the braking forces approximating to a single ideal characteristics curve which corresponds to a predetermined vehicle weight and, when the vehicle weight is varied, provided a distribution of the braking forces which largely deviated from an ideal characteristics curve corresponding to the vehicle weight varied.

On the other hand, most motor vehicles are in recent years provided with a hydraulic braking system of a tandem type which comprises front and rear braking circuits leading from a master cylinder to the front and rear wheel cylinders, respectively separately. However, the above-mentioned braking fluid pressure control valve, when is disposed in the rear braking circuit, generated, in the event of the failure of the fluid pressure in the front braking circuit, the same output fluid pressure as in the event of no such failure. This resulted in the deficiency of the braking force.

Thus, the applicants have proposed a braking fluid pressure control device comprising valve means serving as a proportioning or limiting valve, and control means for controlling a critical fluid pressure in accordance with variation in the vehicle weight to a predetermined value corresponding to the varied vehicle weight to have the valve means generate an output fluid pressure which provides the distribution of the braking forces to the front and rear wheels which distribution approximates to the ideal characteristics curve corresponding to the varied vehicle weight. The valve means comprises a valve seat formed therethrough with an aperture, a plunger extending through the aperture and engageable with the valve seat, and a spring urging the plunger. The control means comprises a fluid chamber into which a master cylinder fluid pressure is delivered, a piston slidably fitted in the fluid chamber and biased by the fluid pressure therein to control the force of the spring, and a ball valve operable to close an inlet port of the fluid pressure to the fluid chamber in response to a predetermined deceleration rate to maintain the pressure of fluid in the fluid chamber at a predetermined value in accordance with the vehicle weight. The plunger is urged by the fluid pressure in the front braking circuit so that in the event of the failure of the fluid pressure the critical fluid pressure is increased to generate an output fluid pressure which is so great as to compensate the deficiency of the braking force.

However, the conventional braking fluid pressure control device has had a drawback that the plunger and the spring are connected to each other so that the plunger receives from the spring a radial force which moves the plunger in a radial direction thereof and causes the plunger to strike an internal peripheral wall of the aperture of the valve seat to damage the plunger and/or the valve seat when the spring is urged toward the plunger by the piston and is moved in a radial direction or the position of the spring relative to the plunger is radially varied.

It is, therefore, an object of the invention to provide an improved braking fluid pressure control device in which a plunger is prevented from receiving a radial force from a spring and accordingly from striking an internal peripheral wall of an aperture of a valve seat and from damaging the valve seat and the plunger by interposing a push rod and a plunger seat between the plunger and the spring, by loosely fitting one end of the push rod in a blind bore formed in the plunger, by supporting the other end of the push rod in a bore formed in the plunger seat, and by slidably fitting the plunger seat in a body of the control device.

This and the other objects and advantages of the invention will become more apparent from the following detailed description taken in connection with the accompanying drawings in which.

Figure 1:
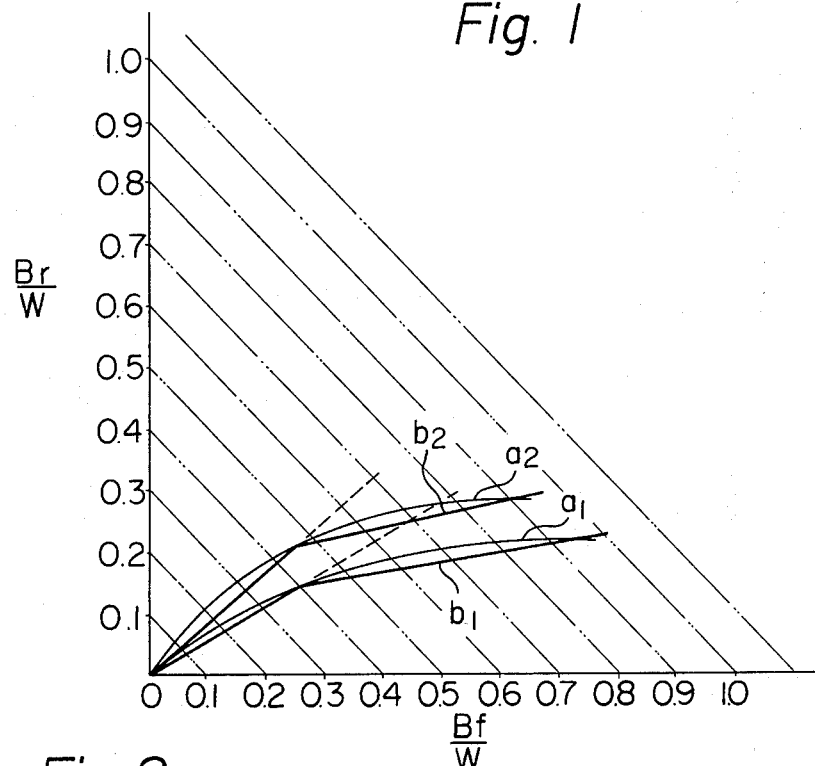
FIG. 1 is a graphic representation of the ideal characteristics curves of the distributions of the braking forces to the front and rear wheels.

Referring to FIG. 1 of the drawings, the ideal characteristics curves $a_1$ and $a_2$ as per the introduction of the specification of the distributions of the braking forces to the front and rear wheels are illustrated on oblique coordinates having the axes of abscissa and ordinate indicating respectively thereon the ratios (deceleration rate ratios) $Bf/W$ and $Br/W$ of the braking forces $Bf$ and $Br$ on the front and rear wheels versus the vehicle weight $W$. The curves $a_1$ and $a_2$ indicate the ideal characteristics at the time when the vehicle weight is $W_1$ (no load) and $W_2$ (the vehicle carries a load), respectively. The general relationship between the ideal characteristics curves and the vehicle weight is such that the heavier the vehicle weight is the higher or the more the ideal characteristics curve is positioned or extends upwardly steeply from the origin O in the graph of FIG. 1.

As is apparent from the graph, the angle of inclination of a tangent of each of the curves $a_1$ and $a_2$ is relatively large within a range of the origin O to a certain value and is relatively small outside the range. In the graph of FIG. 1, there is also illustrated the characteristics lines $b_1$ and $b_2$ of the distributions of the braking forces to the front and rear wheels which distributions are provided to approximate respectively to the ideal charcteristics curves $a_1$ and $a_2$ by a motor vehicle hydraulic braking system incorporating therein a braking fluid pressure control device according to the invention.

Figure 2:
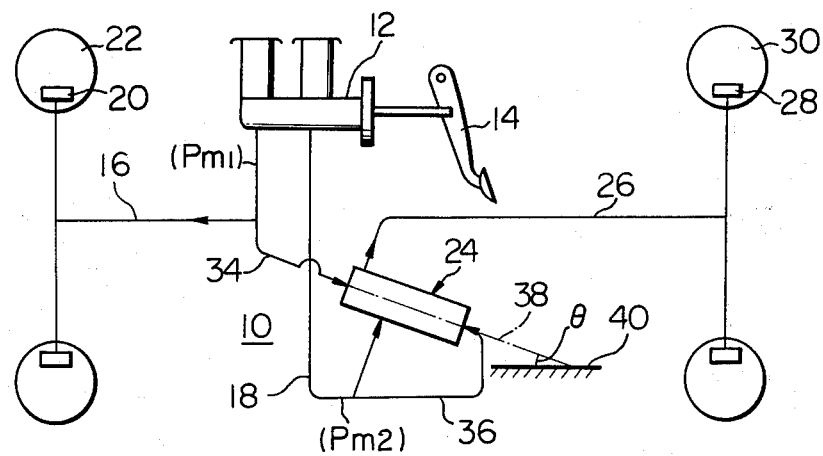
FIG. 2 is a schematic view of a motor vehicle hydraulic braking system incorporating thereinto a braking fluid pressure control device according to the invention.

Referring to FIG. 2 of the drawings, there is shown a motor vehicle hydraulic braking system incorporating therein a braking fluid pressure control device or valve according to the invention. The hydraulic braking system, generally designated by the reference numeral 10, includes a master cylinder 12 operated from a brake pedal 14. First and second hydraulic fluid circuits 16 and 18 lead from the master cylinder 12 to receive fluid pressures $Pm_1$ and $Pm_2$ therefrom, respectively. The fluid pressure $Pm_1$ and $Pm_2$ are equal to each other and are often referred to as the fluid pressure $Pm$ hereinafter. The front fluid line 16 is connected to front wheel cylinders 20 to feed the fluid pressure $Pm_1$ thereinto, which cooperate with brakes (not shown) of front wheels 22 of a motor vehicle, while the rear fluid line 18 is connected to the control device, generally designated by the reference numeral 24, to feed the fluid pressure $Pm_2$ thereinto and is connected from the control device 24 through a fluid line 26 to rear wheel cylinders 28 cooperating with brakes (not shown) of rear wheels 30 of the vehicle. The front and rear braking circuits 16 and 18 are further connected through branch lines 34 and 36 to the control device 24 to feed the fluid pressures $Pm_1$ and $Pm_2$ thereinto, respectively. The control valve 24 is mounted on the body (not shown) of the vehicle to have its axis 38 inclined at an angle of $\theta$ from the horizontal plane 40 so that the forward end portion of the control valve 24 is positioned above the rearward end portion thereof.

Figure 3:
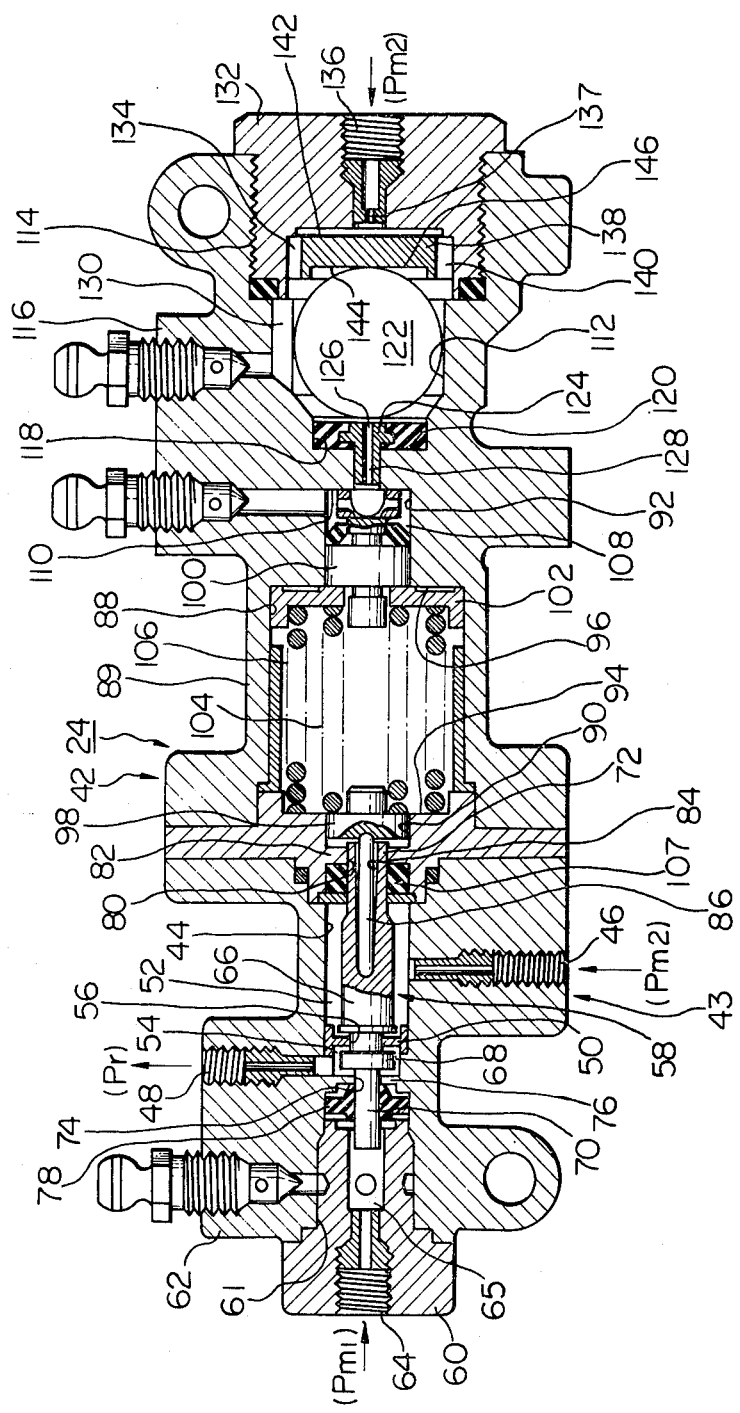
FIG. 3 is a schematic cross sectional view of a preferred embodiment of a braking fluid pressure control device according to the invention.

Referring to FIG. 3 of the drawings, a detailed construction of the braking pressure control valve 24 according to the invention is shown. The control valve 24 comprises a housing 42 formed in its front portion 43 with a first cavity 44 and inlet and outlet ports 46 and 48. The inlet and outlet ports 46 and 48 are connected respectively to the second fluid line 18 and the fluid line 26. An annular sealing member 50 such as a lip type seal is fixedly attached to a wall defining the cavity 44 and divides the cavity 44 into first and second or inner and outer chambers 52 and 54 into which the inlet and outlet ports 46 and 48 open, respectively. The annular sealing member 50 has formed therethrough an aperture 56. A plunger 58 extends through the aperture 56 and is axially movable in the first and second chambers 52 and 54. The aperture 56 provides an annular clearance between the annular sealing member 50 and the plunger 58 to provide fluid communication between the first and second chambers 52 and 54. A plug member 60 is firmly fitted in a bore 61 formed in the forward end portion 62 of the housing 42 and closes the forward end portion 62. The plug member 60 has formed therein an inlet port 64 connected to the branch line 34 of the front braking circuit 16, and a bore 65 communicating with the inlet port 64. The plunger 58 has a stem portion 66 located in the first chamber 52, an annular projection 68 having a cross sectional area of $A_1$, and forward and rearward end portions 70 and 72 having cross sectional areas of $A_2$ and $A_3$, respectively, both of which can be smaller than $A_1$ as shown in FIG. 3. The annular projection 68 is located in the second chamber 54 and is engageable with the annular sealing member 50 to obstruct fluid communication between the first and second chambers 52 and 54, so that the plunger 58 and the sealing member 50 serve respectively as a valve and a valve seat. The forward end portion 70 is connected to the annular projection 68 and is slightly fitted and supported in an aperture 74 formed through a front or outer end wall 76 of the cavity 44 and extends into the bore 65 of the closure member 60 from the aperture 74. The bore 65 is sealed from the second chamber 54 by a seal member 78. The rearward end portion 72 is connected to the stem portion 66 and is slidably fitted and supported in an aperture 80 formed through a rear or inner end wall 82 of the cavity 44. The rear end portion 72 is formed therein with a blind bore 84 extending to a position adjacent to the valve seat 50 and having a blind end and an open end. The bore 84 is tapered toward the blind end. A push rod 86 is located in the bore 84 and abuts against the blind end of the bore 84 and extends externally of the bore 84. The bore 84 provides between the plunger 58 and the push rod 86 at the blind end a clearance so small as to be unable to be shown and at the open end a relatively large clearance as shown in FIG. 3.

The housing 42 further has a second cavity 88 formed in its mid portion 89, and two opposite bores 90 and 92 formed in opposite end walls 94 and 96 of the cavity 88 and both opening into the cavity 88. The bore 90 is located between the end wall 82 and the cavity 88. Two pistons 98 and 100 are slidably fitted in the bores 90 and 92, respectively. The push rod 86 extends from the bore 84 of the plunger 58 into the bore 90 and engages a bore formed in the plunger seat 98. A spring seat 102 is slidably fitted in the cavity 88 and is in abutting engagement with the end wall 96 and/or the piston 100. An inner compression spring 104 is located between the plunger seat 98 and the spring seat 102 to urge these members is opposite directions. The push rod 86 and the piston 98 serve as sensing means which is responsive to or senses only a force axially acting thereon from the spring 104 to permit the axial force to act on the plunger 58 and which absorbs a force radially acting on the sensing means from the spring 104 to prevent the radial force from acting on the plunger 58 which force moves the plunger 58 in a radial direction and causes the plunger 58 to strike the valve seat 50 to damage the plunger 58 and the valve seat 50 when the spring 104 is urged toward the plunger 58 by the piston 100 and it is moved in a radial direction or the position of the spring 104 relative to the plunger 58 is radially varied. An outer compression spring 106 is located between the end wall 94 and the spring seal 102 to urge the latter against the piston 100 and/or the end wall 96. The piston 100 has a cross sectional area of $A_4$. The bore 90 is sealed from the first chamber 52 by a seal member 107. A fluid chamber 108 is defined in the bore 92 between the piston 100 and an end wall 110 of the bore 92.

The housing 42 further has a third cavity 112 and a bore 114 which are formed on its rear end portion 116, and a bore 118 formed in an end wall 120 of the cavity 112. A ball member 122 is rotatably or rollably fitted in the cavity 112. A valve seat member 124 is firmly fitted in the bore 118 and has formed therethrough an aperture 126 opening into the cavity 112 and communicating with the fluid chamber 108 through a passage 128. The ball member 122 serves as a valve which is responsive to a predetermined deceleration rate or inertia force to move to the valve seat 124 and to engage the same to close the inlet port 126 to the fluid chamber 108. A plurality of grooves 130 are formed in a wall defining the cavity 112 and surrounding the ball member 122 and extends axially of the housing 42. A plug member 132 is threaded in the bore 114 to close the rear end portion 116 of the housing 42 and is formed therein with a bore 134 opening into the cavity 112 and an inlet port 136 communicating with the bore 134 through an orifice 137 and connected to the branch line 36 of the rear braking circuit 18. A member 138 for supporting the ball member 122 is press fitted in the bore 134 and is formed in its circumferential surface 139 with a plurity of axial grooves 140 which communicate with the grooves 130 and with the inlet port 136.

The ball support member 138 is not formed with an aperture penetrating from its outer end surface 142 to its inner end surface 144 so that the flow of the fluid pressure $Pm_2$ from the inlet port 136 is prevented from striking a rear surface 146 of the ball member 122 and from exerting thereon a thrust which moves the ball member 122 toward the valve seat 124 to have a bad influence upon the admission of the fluid pressure $Pm_2$ into the fluid chamber 108 and to hinder the ball member 122 moving to the valve seat 124 in response to a predetermined deceleration rate correctly. The support member 138 serves as barrier or baffle means which causes the flow of the fluid pressure $Pm_2$ from the inlet port 136 to diverge toward the peripheral edge of the support member 138 or the internal circumferential wall of the bore 134 along the outer end surface 142 and to pass through the grooves 140 and 130 to the inlet port 126.

The orifice 137 serves as delay means which causes variation in the fluid pressure $Pm_2$ to transmit to the fluid chamber 108 with a suitable time lag to cause the pressure of fluid in the fluid chamber 108 to increase at a predetermined rate irrespective of the rate of increase in the fluid pressure $Pm_2$. This is to prevent the pressure of fluid in the fluid chamber 108 from being varied in accordance with the rate of increase in the fluid pressure $Pm_2$ when the ball member 122 moves to the valve seat 124 to close the inlet port 126 in response to the predetemined deceleration rate. It is desirable to use a diameter within the range of 0.6 to 0.8 millimeter or a cross sectional area within the range of about 0.282 to 0.503 square millimeter.

The braking pressure control device 24 thus far described is operated as follows:

When the brake pedal 14 is depressed, the master cylinder 12 delivers hydraulic fluid pressures $Pm1$ and $Pm2$ into the front and rear braking circuits 16 and 18. The fluid pressure $Pm1$ is fed into the front wheel cylinders 20 and through the inlet port 64 into the bore 65 of the pressure control valve 24. The fluid pressure $Pm2$ is fed as an input fluid pressure into the first chamber 52 of the pressure control valve 24 through the inlet port 46 and is then delivered into the second chamber 54 through the aperture 56 of the annular sealing member 50 as an output hydraulic fluid pressure $Pr$ which has been modulated or unmodulated. The outlet fluid pressure $Pr$ in the second chamber 54 is fed into the rear wheel cylinders 28 through the outlet port 48. The fluid pressure $Pm2$ is also fed into the fluid chamber 108 of the pressure control valve 24 through the inlet port 136, the grooves 140 and 130, and the aperture 126 of the seat member 124.

When the input fluid pressure $Pm$ is less than a critical fluid pressure $Ps$, the output fluid pressure $Pr$ in the second chamber 54 is equal to the input fluid pressure $Pm$, that is, $$Pr = Pm \qquad \text{Eq. 1}$$

In this condition, when the input fluid pressure $Pm$ is increased and the fluid pressure $Pm$ in the bore 65 exerts on the forward end portion 70 of the plunger 58 a force $Pm \times A_3$ exceeding the force $F_1$ of the inner spring 104, the plunger 58 is moved into a closed position in which the annular projection 68 engages or is pressed against the annular sealing member 50 to obstruct fluid communication between the first and second chambers 52 and 54. At this time, the input fluid pressure $Pm$ is equal to the critical fluid pressure $Ps$ and the following relation is obtained:

$$Ps \times A_3 = F_1$$

Accordingly, the critical fluid pressure $Ps$ is expressed as $$Ps = F_1/A_3 \qquad \text{Eq. 2}$$

In this instance, since the displacement of the plunger 58 is extremely small, an increase in the force of the spring 104 is so little as to be neglected.

When the input fluid pressure $Pm$ subsequently further increases, the fluid pressure $Pm$ in the first chamber 52 exerts on the annular projection 68 a force which urges the plunger 58 into an open position to unseat the annular projection 68 from the annular sealing member 50. When the annular projection 68 is unseated from the annular sealing member 50, the fluid pressure $Pm$ in the first chamber 52 is allowed to flow into the second chamber 54 to cause an increase in the output fluid pressure $Pr$. At this time, i.e., when $Pm \geq Ps$, the following equilibrium equation is established:

$$PmA_2 + Pr(A_1 - A_2) = Pm(A_1 - A_3) + F_1 \qquad \text{Eq. 3}$$

Accordingly, the output fluid pressure $Pr$ is expressed as $$Pr = \frac{A_1 - A_3 - A_2}{A_1 - A_2} Pm + \frac{F_1}{A_1 - A_2} \qquad \text{Eq. 4}$$

Figure 4:
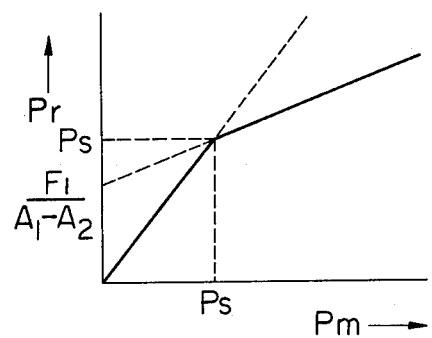
FIG. 4 is a graphic representation of the relationship between the input fluid pressure into and the output fluid pressure from the braking fluid pressure control device shown in FIG. 3.

The output fluid pressure $Pr$ delivered from the outlet port 48 under the control of the pressure control valve 24 is given by either of the Equations 1 and 4 in accordance with the input fluid pressure $Pm$. Thus, when the input fluid pressure $Pm$ increases from zero, the output fluid pressure $Pr$ increases at the same rate as the input fluid pressure $Pm$ until the input fluid pressure $Pm$ reaches the critical fluid pressure $Ps$, as shown in FIG. 4 of the drawings. When the input fluid pressure $Pm$ increases above the critical fluid pressure $Ps$, the output fluid pressure $Pr$ increases at the rate of [wherein $m = (A_1 - A_3 - A_2)/(A_1 - A_2)$] which is smaller than the rate of increase in the input fluid pressure $Pm$, as shown in FIG. 4.

On the other hand, when the braking force B on the wheels increases with increase in the fluid pressure $Pm$ from the master cylinder 12, the ratio of the rate $a$ of deceleration versus a gravitational acceleration $g$ also increases. This deceleration rate ratio $a/g$ is equal to the ratio of the braking force B versus the overall weight W of the motor vehicle as follows:

$$\frac{a}{g} = \frac{B}{W} \qquad \text{Eq. 5}$$

The braking force B is proportional to the master cylinder fluid pressure $Pm$ as follows:

$$B = CPm \text{ (wherein } C \text{ is a constant)} \qquad \text{Eq. 6}$$

When the deceleration reate ratio $a/g$ reaches a predetermined value of $(a/g)_\Theta$ which is a function $f(\theta)$ of the angle $\theta$ of inclination of the pressure control valve 24, the ball valve 122 rolls forwardly in response to the predetermined deceleration rate to seat on the valve seat 124 to close the inlet port 126 to isolate the fluid chamber 108 from the inlet port 136. Thus, even if the fluid pressure $Pm$ subsequently increases, the fluid pressure in the fluid chamber 108 is maintained at a fluid pressure $Pg$ which is equal to the fluid pressure $Pm$ at the moment when the inlet port 126 has been closed by the ball valve 122. The fluid pressure $Pg$ is expressed from the Eqs. 5 and 6 and the Eq. 7 $[(a/g)_\Theta = f(\theta)]$ as $$Pg = \frac{W}{C} f(\theta) \qquad \text{Eq. 8}$$

At this time, from the condition of equilibrium of the piston 100 and the Eq. 8, the following equation is obtained:

$$F_1 + F_2 = Pg \cdot A_4 = \frac{f(\theta)}{C} A_4 \cdot W \qquad \text{Eq. 9}$$

where $F_2$ is the force of the outer spring 106.

The forces $F_1$ and $F_2$ of the inner and outer springs 104 and 106 are expressed respectively as the sums of the preset or initial loads $f_1$ and $f_2$ of the springs 104 and 106 and the products of the amounts of deflection or shrinkage of the springs 104 and 106 by a compressive force from the piston 100 and the spring constants $K_1$ and $K_2$ of the springs 104 and 106. In this instance, since the amounts of deflection of the springs 104 and 106 are equal to each other, the following equation is obtained:

$$F_2 = f_2 + \frac{K_2}{K_1}(F_1 - f_1) \qquad \text{Eq. 10}$$

From the Eqs. 9 and 10, the force $F_1$ of the springs 104 is obtained as $$F_1 = \frac{\frac{f(\theta)}{C} A_4 W - (f_2 - \frac{K_2}{K_1} f_1)}{1 + \frac{K_2}{K_1}} \qquad \text{Eq. 11}$$

Substitution of the Eq. 11 into the Eq. 2 results in $$Ps = \frac{\frac{f(\theta)}{C} A_4 W - (f_2 - \frac{K_2}{K_1} f_1)}{A_3(1 + \frac{K_2}{K_1})} \qquad \text{Eq. 12}$$

When $Pm \geq Ps$ $$Pr = mPm + \frac{F_1}{A_1 - A_2}$$

$$= mPm + \frac{\frac{f(\theta)}{C} A_4 W - (f_2 - \frac{K_2}{K_1} f_1)}{(A_1 - A_2)(1 + \frac{K_2}{K_1})}$$

Figure 5:
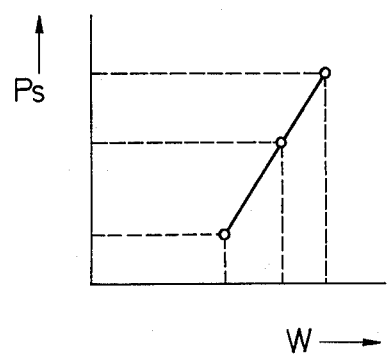
FIG. 5 is a graphic representation of the relationship between the critical fluid pressure of the braking fluid pressure control device shown in FIG. 3 and the vehicle weight.

It is apparent from the Eq. 12 that by selecting the variables in the Eq. 12 in a manner to make the value of $(f_2 - f_1 K_2/K_1)$ positive, the critical fluid pressure $Ps$ increases at a rate greater than that of increase in the vehicle weight W when the vehicle weight increases, as shown in FIG. 5 of the drawings. As a result, the characteristics of the distribution of the braking forces to the front and rear wheels approximate to the ideal characteristics curves $a_1, a_2 \ldots$ of FIG. 1 in accordance with increases in the vehicle weight W.

Since the support member 138 serving as the barrier means prevents the flow of the fluid pressure $Pm2$ from the inlet port 136 from striking the rear surface 146 of the ball member 122 and from exerting on the ball member 122 a thrust which moves the same toward the valve seat 124, the ball member 122 does not impede the admission of the fluid pressure $Pm2$ into the fluid chamber 108 to provide the forces of the springs 104 and 106 which forces are controlled by the fluid pressure $Pm2$ through the piston 100 to a desired or predetermined value and the ball member 122 moves to the valve seat 124 in response to a desired or predetermined deceleration rate accurately to have the control device 24 perform its desired function or operation accurately.

Since the fluid pressure $Pm2$ is fed into the fluid chamber 108 through the orifice 137, the pressure of fluid confined in the fluid chamber 108 is maintained at a predetermined value irrespective of or is slightly varied in accordance with the rate of increase in the fluid pressure $Pm2$ when the ball valve 122 closes the inlet port 126. As a result, the pressure control device 24 can control the critical fluid pressure $Ps$ to a predetermined value in accordance with variation in the vehicle weight to perform its desired function accurately.

In the event of the failure of the fluid pressure $Pm1$ in the first fluid circuit 16, since $PmA_2 = 0$ in the Eq. 3, the following equation is obtained:

$$Pr(A_1 - A_2) = Pm(A_1 - A_3) + F_1$$

Accordingly, the output fluid pressure $Pr$ is obtained as $$Pr = \frac{A_1 - A_3}{A_1 - A_2} Pm + \frac{F_1}{A_1 - A_2}$$

$$\frac{A_1 - A_3}{A_1 - A_2} = m' > m$$

In this instance, between the braking force B on the wheels and the input fluid pressure $Pm$ the following relation is provided:

$$B = C'Pm$$

where $C' < C$. Hence, the force $F_1$, of the spring 104 is expressed as $$F_1' = \frac{\frac{f(\theta)}{C'} A_4 W - (f_2 - \frac{K_2}{K_1} f_1)}{1 + \frac{K_2}{K_1}}$$

When the input fluid pressure $Pm$ is at a critical fluid pressure $Ps'$, the following equation is obtained:

$$Ps'(A_3 - A_2) = F_1'$$

Accordingly, the critical fluid pressure $Ps'$ is obtained as $$Ps' = \frac{\frac{f(\theta)}{C'} A_4 W - (f_2 - \frac{K_2}{K_1} f_1)}{(A_3 - A_2)(1 + \frac{K_2}{K_1})}$$

where $Ps' > Ps$. Accordingly, it is apparent that the critical fluid pressure $Ps'$ is increased to a considerably high value which provides a braking force so great as to compensate the failure of the fluid pressure $Pm1$ in the first fluid circuit 16.

Since the spring 104 is connected to the plunger 58 through the push rod 86 and the piston 98, only an axially acting force is exerted on the plunger 58 from the spring 104 and a radially acting force is prevented from being exerted on the plunger 58 from the spring 104 to prevent the plunger 58 and the valve seat 50 from being damaged. Also, since the plunger 58 is urged at its portion adjacent to the valve seat 50 by the push rod 86, the possibility of the plunger 58 being radially urged by the push rod 86 for any reason is avoided. Furthermore, a radial force exerted on the push rod 86 for any reason is absorbed or relieved by the clearance between the internal wall of the bore 84 of the plunger 58 and the push rod 86 to be prevented from acting on the plunger 58.

It will be appreciated that the invention provides a braking fluid pressure control device of a type generating an output fluid pressure which provides the distributions of the braking forces to the front and rear wheels which approximate to the ideal characteristics curves of the braking force distributions varied in accordance with variation in the vehicle weight which device comprises sensing means which is interposed between valve means for generating the output fluid pressure and biasing means for urging the valve means and senses an axial force axially acting on the sensing means from the biasing means to permit the axial force to act on a plunger of the valve means and absorbs a radial force radially acting on the sensing means from the biasing means to prevent the radial force from acting on the plunger, and the plunger from striking a valve seat, and the plunger and the valve seat from being damaged.

Although the invention has been described as being applied to a braking fluid pressure control device comprising a proportioning valve, the invention can be applied to a braking fluid pressure control device comprising a limiting valve in place of a proportioning valve.

What is claimed is:

1. A fluid pressure control device for a motor vehicle hydraulic braking system, comprising a housing formed therein with a first cavity having outer and inner opposite end walls, each of said end walls being formed with an aperture, a plunger axially movably extending through said first cavity and slidably fitted in said apertures, said plunger having a first series of positions in which an input fluid pressure is less than a critical fluid pressure and an output fluid pressure is equal to said input fluid pressure, and a second series of positions in which said input fluid pressure is greater than said critical fluid pressure and said output fluid pressure is less than said input fluid pressure, said plunger being formed with a first bore which extends inwardly and axially from an inner end of said plunger and has a blind end and an open end, said first bore being tapered toward said blind end, a push rod located in said first bore and engaging against said blind end and projecting from said open end outside said plunger, said first bore providing at said open end a clearance between said plunger and said push rod, said clearance being reduced toward said blind end, said housing being formed therein with a second cavity and a second bore which opens into said second cavity and is located between said inner end wall and said second cavity, a plunger seat slidably fitted in said second bore and engaging against an inner end of said push rod, biasing means located in said second cavity, said housing being formed therein with a fluid chamber into which a second fluid pressure equal to said input fluid pressure is delivered, a piston slidably fitted in said fluid chamber, said biasing means being located between said plunger seat and said piston to urge same in opposite directions, said piston being urged by the pressure of fluid in said fluid chamber to urge said biasing means, and a control valve operable in response to a predetermined deceleration rate to close an inlet of said second fluid pressure to said fluid chamber to maintain the pressure of fluid in said fluid chamber at a predetermined value.

2. A fluid pressure control device for a motor vehicle hydraulic braking system, comprising a housing formed therein with a first cavity which has outer and inner opposite end walls and is divided into outer and inner fluid chambers, each of said end walls being formed with an aperture, a plunger axially movably extending through said outer and inner fluid chambers to alternatively provide and interrupt communication between said outer and inner fluid chambers and slidably fitted in said apertures, said plunger having a first series of positions in which it provides said communication and said input fluid pressure is lower than a critical fluid pressure and said output fluid pressure is equal to said input fluid pressure, a second position in which said plunger interrupts said communication and said input fluid pressure is equal to said critical fluid pressure, and a third series of positions in which said plunger provides said communication and said input fluid pressure is higher than said critical fluid pressure and said output fluid pressure is less than said input fluid pressure, said plunger being formed with a first bore which extends inwardly and axially from an inner end of said plunger and has a blind end and an open end, said first bore being tapered toward said blind end, a push rod located in said first bore and engaging against said blind end and projecting from said open end outside said plunger, said first bore providing at said open end a clearance between said plunger and said push rod, said clearance being reduced toward said blind end, said housing being formed therein with a second cavity and a second bore which opens into said second cavity and is located between said inner end wall and said second cavity, a plunger seat slidably fitted in said second bore and engaging against an inner end of said push rod, biasing means located in said second cavity and urging said plunger seat, said housing being formed therein with a third fluid chamber into which a second fluid pressure equal to said input fluid pressure is delivered, a piston slidably fitted in said third fluid chamber, said biasing means being located between said plunger seat and said piston to urge same in opposite directions, said piston being urged by the pressure of fluid in said third fluid chamber to urge said biasing means, said housing formed therein with a fourth fluid chamber communicating with said third fluid chamber, and a control valve disposed in said fourth fluid chamber and operable in response to a predetermined deceleration rate to separate said third fluid chamber at a predetermined value, said housing being formed with passage means communicating with said fourth fluid chamber for conducting said second fluid pressure into said fourth fluid chamber.

3. A fluid pressure control device as claimed in claim 2, further comprising a valve supporter located between said control valve and an end portion of said housing to normally support said control valve, said valve supporter having an aperture which penetrates said valve supporter and opens into said fourth fluid chamber from said valve supporter at a portion confronting said control valve, said valve supporter being formed outside said portion confronting said control valve with second passage means providing communication between the first mentioned passage means and said fourth fluid chamber.

4. A fluid pressure control device as claimed in claim 3, in which said end portion of said housing comprises an end plug fixedly, secured to said housing to close an open end of said housing and formed with a third bore merged into said fourth fluid chamber, said first mentioned passage means being formed through said end plug and opening into said third bore, and means for fixedly attaching said end plug to an internal wall of said third bore.

5. A fluid pressure control device as claimed in claim 2, in which said passage means is provided therein with delay means for causing variation in said second fluid pressure to transmit to said third fluid chamber with a time lag and for preventing the pressure of fluid in said third fluid chamber from being varied by variation in said second fluid pressure while said control valve is moved into a position in which it separates said third fluid chamber from said fourth fluid chamber.

6. A fluid pressure control device as claimed in claim 4, in which said valve supporter comprises a disk member and said second passage means comprises a plurality of grooves formed in its peripheral portion.

7. A fluid pressure control device as claimed in claim 5, in which said delay means comprises an orifice formed in said passage means.

8. A fluid pressure control device as claimed in claim 7, in which said orifice has a cross sectional area within the range of 0.282 to 0.503 square millimeter.

9. A hydraulic braking system for a motor vehicle comprising a master cylinder of a tandem type, front wheel cylinders, rear wheel cylinders, a fluid pressure control device as claimed in claim 2, said fluid pressure control device further comprising bore means defining a bore which adjoins said outer fluid chamber and is separated from said outer fluid chamber, a front braking circuit leading from said master cylinder and communicating with said front wheel cylinders and with said bore of said control device, a rear braking circuit leading from said master cylinder and communicating with said first chamber of said control device and with said passage means, said outer fluid chamber communicating with said rear wheel cylinders, said plunger having an extension which extends from said second chamber into said bore and on which a fluid pressure from said master cylinder acts to urge said plunger toward said biasing means.

* * * * *